(12) United States Patent
Chikada

(10) Patent No.: US 6,667,129 B2
(45) Date of Patent: Dec. 23, 2003

(54) BATTERY PACK

(75) Inventor: Tatsuhisa Chikada, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 92 days.

(21) Appl. No.: 09/918,817

(22) Filed: Aug. 1, 2001

(65) Prior Publication Data

US 2002/0018932 A1 Feb. 14, 2002

(30) Foreign Application Priority Data

Aug. 2, 2000 (JP) .................................. 2000-234576

(51) Int. Cl.[7] .................................................. H01M 2/10
(52) U.S. Cl. ........................................ 429/99; 429/123
(58) Field of Search ......................... 429/123, 96–100

(56) References Cited

U.S. PATENT DOCUMENTS 3,967,979 A * 7/1976 Kaye ............................ 429/99
6,235,420 B1 * 5/2001 Ng .............................. 429/96
6,599,657 B1 * 7/2003 Pollett et al. ................ 429/96

OTHER PUBLICATIONS

The Derwent abstract for JP 09–027306 A (Jan. 1997).*

* cited by examiner

Primary Examiner—Susy Tsang-Foster
(74) Attorney, Agent, or Firm—Greenblum & Bernstein, P.L.C.

(57) ABSTRACT

A battery pack is fabricated as follows. A pack case, made from a resin sheet by vacuum molding, is formed of an upper case and a lower case coupled to each other via a hinge. Inside the lower case is housed a battery block composed of a rechargeable battery and circuit substrates formed integrally together. The pack case is folded in two on the hinge whereby the upper case covers the battery block. The side surfaces thereof are sealed with sealing tapes.

10 Claims, 4 Drawing Sheets

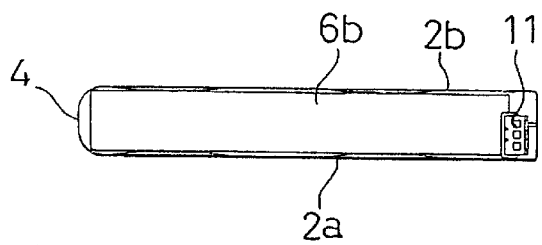
Fig. 2B
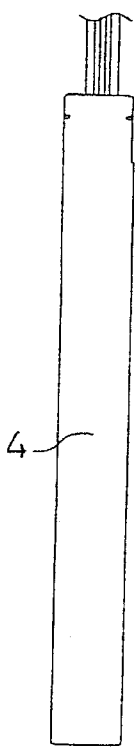
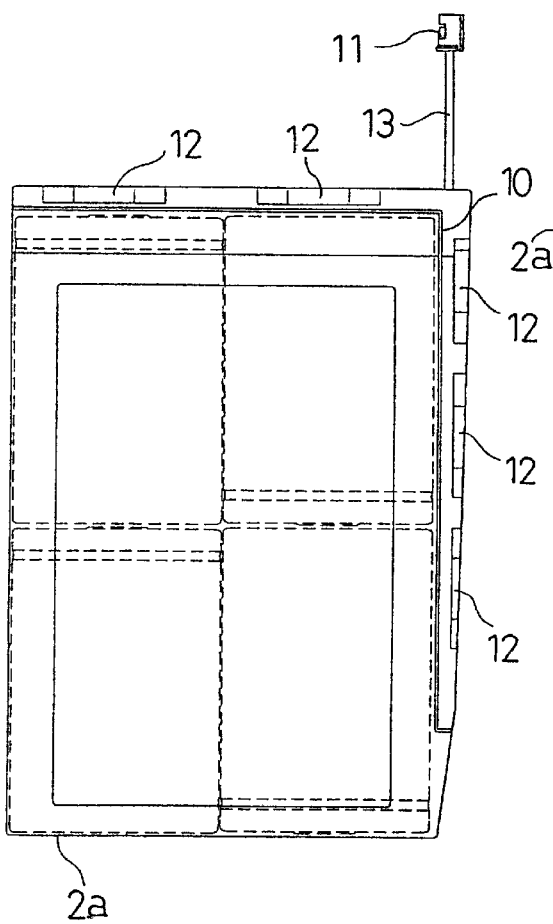
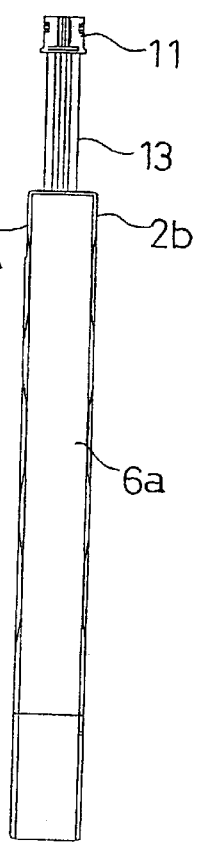
Fig. 2C  Fig. 2A  Fig. 2D

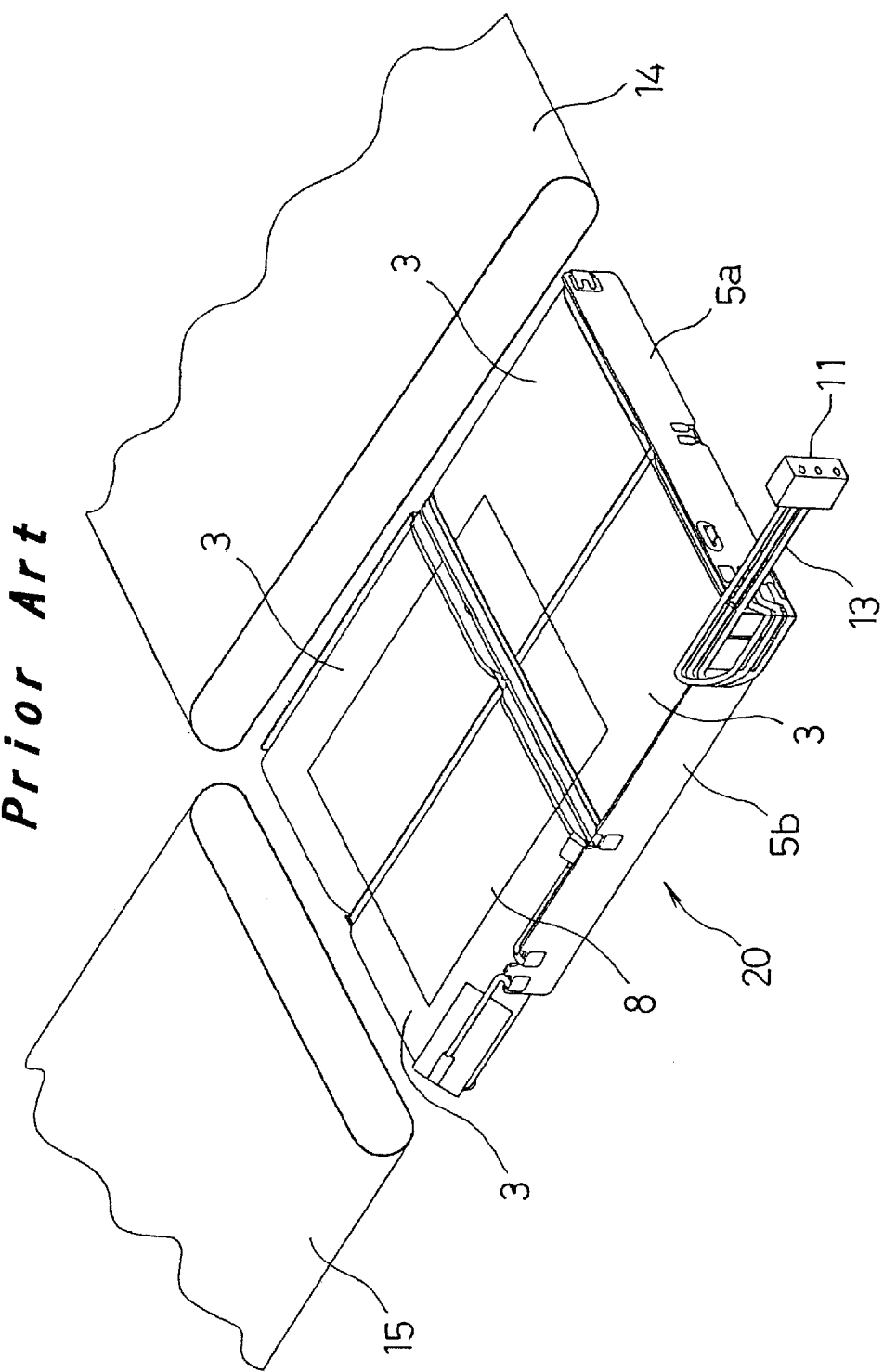

BATTERY PACK

The present disclosure relates to subject matter contained in priority Japanese Patent Application No. 2000-234576, filed on Aug. 2, 2000, the contents of which is herein expressly incorporated by reference in its entirety.

BACKGROUND OF THE INVENTION

1. Technical Field of the Invention

The present invention relates to a battery pack having a rechargeable battery and a circuit substrate constituting a power circuit, the battery and the substrate being housed in a pack case.

2. Description of Related Art

To achieve more compact and slimmer portable information equipment, such as a cellular phone or a portable computer, batteries used therefor as power sources are required to be made more compact and slimmer. As power sources for such equipment, rechargeable batteries having high energy density are preferable. Specifically, lithium-base rechargeable batteries are suitably used. A rechargeable battery having high energy density necessitates a mechanism for protecting the battery against overcharge, overdischarge, overcurrent, and the like. Moreover, a circuit for monitoring battery temperatures and measuring battery remaining capacity is an essential mechanism when a rechargeable battery is used as power source for portable information equipment. The mechanism is constructed on a circuit substrate as a power circuit, and the circuit substrate is formed integrally with a rechargeable battery to constitute a battery pack.

FIG. 4 illustrates the structure of a conventional battery pack employing a prismatic lithium ion rechargeable battery. In this battery pack, four prismatic lithium ion rechargeable batteries 3 and two circuit substrates 5a and 5b are formed integrally together to constitute a battery block 20. Although the battery block 20 is capable of functioning as a battery power source on its own, outer packaging is necessary to ensure high handleability, sufficient insulation, safety, and the like. To secure a sufficient rigidity in the battery pack, outer packaging using a pack case for housing the battery block 20 is desirable. In this case, however, it is likely to fail to meet requirements of compactness, light weight, and slimness.

The conventional battery pack employs heat-shrinkable tubes 14 and 15 as the outer packaging of the battery block 20 in order to reduce the size and the weight of the battery pack. Specifically, the battery block 20 is covered with heat-shrinkable tubes 14 and 15 from longitudinal and transverse directions, and is then subjected to a heating treatment to shrink the tubes, thereby providing an exterior cover on the battery block 20. Consequently, a desired battery pack is realized. This battery pack is connected to the equipment in use through a connector 11 attached to the tip of a lead 13 drawn out of the circuit substrate 5a.

However, a battery pack having its outer packaging realized by using a heat-shrinkable tube has the following disadvantages.

(1) A molding by exploiting heat contraction is structurally unstable. It is therefore inferior in dimensional accuracy and suffers from wrinkles or swells, which detracts from the appearance thereof.

(2) Heat contraction-using molding is time-consuming and is thus lacking in productivity.

(3) A heating treatment needs to be performed at a temperature higher than the softening point of the heat-shrinkable tube, which might cause heat deterioration in the members constituting the battery block.

(4) The members constituting the battery block are subjected to external pressure due to the contraction pressure exerted by the heat-shrinkable tube, and consequently suffer from a stress.

(5) Heat-shrinkable tubes are typically made from soft polyvinyl chloride and thus place a heavy load on the environment. For example, dioxin is generated by the burning of the waste.

(6) When leakage of electrolyte from the rechargeable battery occurs, the electrolyte tends to find its way into the circuit substrate, whereby the circuit might be destroyed.

(7) The circuit substrate is covered only with the heat-shrinkable tube and is thus susceptible to damage resulting from a shock or the like.

SUMMARY OF THE INVENTION

An object of the present invention is to provide a compact battery pack smaller in size and lighter in weight.

To achieve the above object, according to a first aspect of the invention, there is provided a battery pack constituted by a battery block housed in a pack case, the battery block being composed of a rechargeable battery and a circuit substrate formed integrally together, the circuit substrate constituting a power circuit. The pack case includes upper and lower cases formed from a thin-walled resin sheet, and shaped half-shell rectangular parallelepiped with their one sides coupled to each other by a hinge. The battery block is housed in the pack case folded in two on the hinge, and the side surfaces of the upper and lower cases are joined together by placing a strip of tape. In the pack case, the upper and lower cases are formed integrally together, which allows the battery pack to be fabricated simply by housing the battery block in the pack case, closing it at the hinge, and securing the pack case with the strip of tape, so that the workability improves.

According to a second aspect of the invention, there is provided a battery pack constituted by a battery block housed in a pack case, the battery block being composed of a rechargeable battery and a circuit substrate formed integrally together, the circuit substrate constituting a power circuit. The pack case includes upper and lower cases formed from a thin-walled resin sheet, and shaped half-shell rectangular parallelepiped with their one sides coupled to each other by a hinge. The pack case is folded in two on the hinge so as to accommodate the battery block composed of a flat prismatic rechargeable battery and a circuit substrate disposed on the surface of the thickness-direction side of the rechargeable battery formed integrally together. The side surfaces of the upper and lower cases are joined together by placing a strip of tape. The use of a flat prismatic rechargeable battery helps reduce the thickness of the battery block. The battery pack is fabricated simply by housing the battery block in the pack case formed of the upper and lower cases formed integrally together, closing it at the hinge, and securing the pack case with the strip of tape. That is, a slim and compact battery pack is fabricated with high workability.

These and other objects and characteristics of the present invention will become further clear from the following description with reference to the accompanying drawings.

BRIEF DESCRIPTION OF THE DRAWINGS

FIG. 2A is a plan view of the battery pack in finished form;

FIG. 2B is a side view of the battery pack as seen from above;

FIG. 2C is a left side view of the battery pack;

FIG. 2D is a right side view of the battery pack;

FIG. 4 is an exploded perspective view illustrating the structure of a prior art battery pack.

DETAILED DESCRIPTION OF THE PREFERRED EMBODIMENTS

Figure 1:
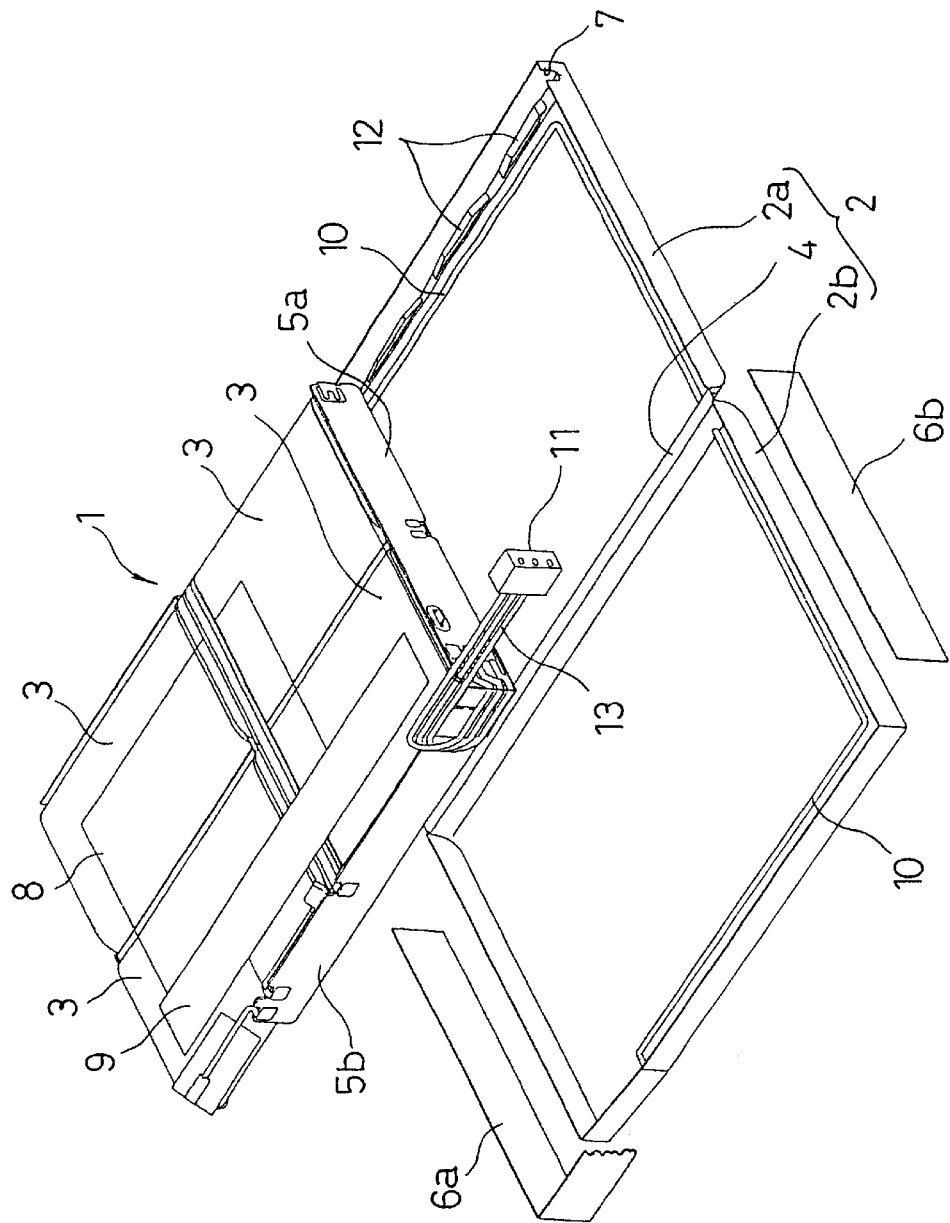
FIG. 1 is an exploded perspective view illustrating the structure of a battery pack according to one embodiment of the present invention.
Figure 3:
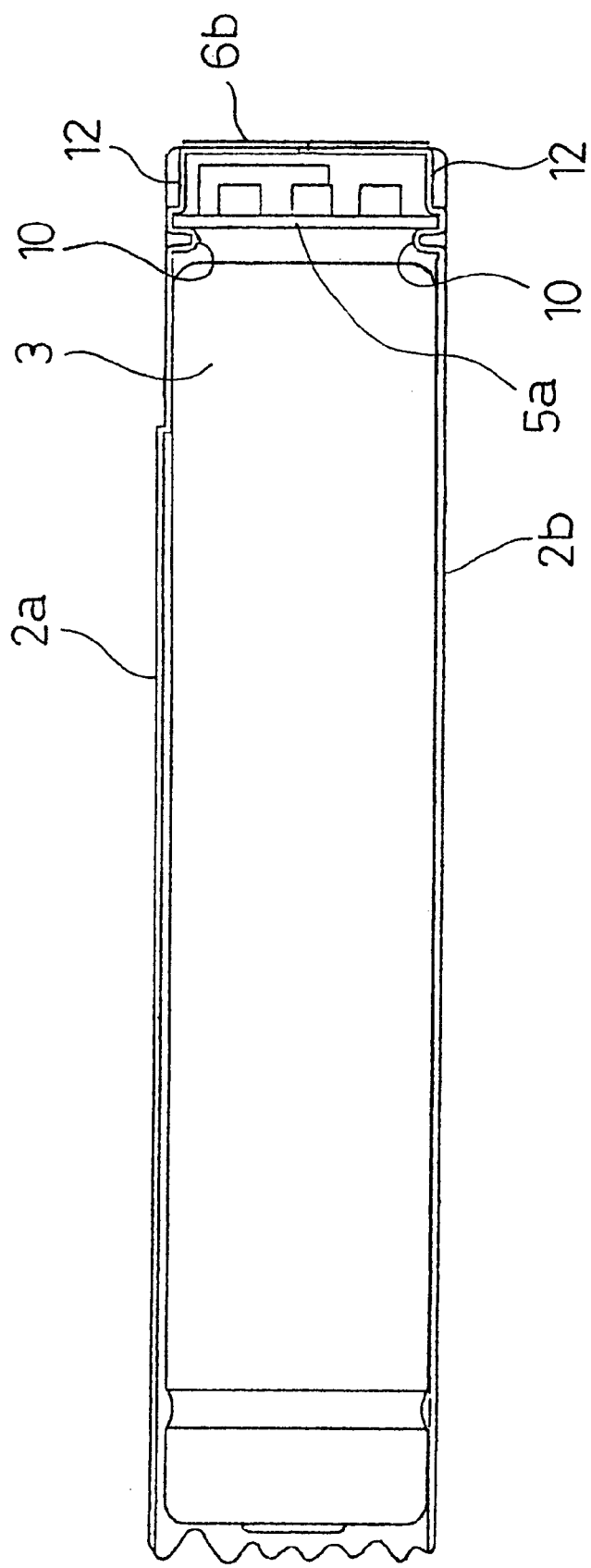
FIG. 3 is an enlarged sectional view illustrating the structure of the portion where the circuit substrate is disposed.

Preferred embodiments of the present invention will be hereinafter described in the form of a battery pack as a power source for portable personal computers as examples. As shown in FIG. 1, a battery pack includes a battery block 1 housed in a pack case 2 formed by vacuum molding. The battery block 1 is composed of four prismatic lithium ion rechargeable batteries 3 and first and second circuit substrates 5a and 5b, the batteries and the circuit substrates being formed integrally together. The circuit substrates constitute a circuit for protecting the rechargeable batteries 3 against overcharge, overdischarge, and the like, and performing battery control such as measuring battery remaining capacity by communicating with the computer.

As shown in FIG. 1, the battery block 1 includes four rechargeable batteries 3 arranged in two in-line rows and columns with their positive and negative electrodes mutually connected, the rechargeable batteries being connected to the first circuit substrate 5a and the second circuit substrate 5b, and being fabricated into a single-piece construction by using a transparent adhesive sheet 8. The first and second circuit substrates 5a and 5b are disposed on the side surfaces of the rechargeable batteries 3 in the shape of a letter L, and are mutually connected by a flat cable. The first and second circuit substrates 5a and 5b are fixed to the side surfaces of the rechargeable batteries 3 by soldering a connecting plate for establishing connection with the rechargeable batteries 3.

Moreover, a lead wire 13 is drawn out of the first circuit substrate 5a, the lead wire 13 having its tip attached to a connector 11 for establishing connection with the computer. On the top surface of the battery block 1, a double-faced adhesive tape 9 is stuck.

The pack case 2 for housing the battery block 1 is formed from a 0.25 mm-thick polycarbonate resin (flame retardant resin which meets the requirements of UL94V-O) sheet by vacuum molding. The pack case 2 may be formed by compressed air forming. As shown in FIG. 1, the pack case 2 is built as a single-piece construction that is formed of upper and lower cases 2a and 2b in the shape of half-shell rectangular parallelepiped coupled to each other via a hinge 4.

A description will be given below as to a procedure by which the battery block 1 is housed in the pack case 2 to constitute a battery pack.

First, on the lower case 2b of the pack case 2 the battery block 1 is disposed, and the released paper sheet of the double-faced adhesive tape 9 stuck on the top surface of the battery block 1 is removed. Then, the pack case 2 is folded in two on the hinge 4 so that the upper case 2a is pressed against the top surface of the battery block 1, thereby bringing the upper case 2a into a temporarily fixed state with the aid of the double-faced adhesive tape 9. Before the upper case 2a is closed, the lead 13 is drawn to the outside from a lead through hole 7 formed on the upper case 2a.

The sum of the depths of the upper and lower cases 2a and 2b is made smaller than the thickness of the battery block 1. Consequently, after the pack case 2 is closed, i.e., when the upper and lower cases 2a and 2b confront each other, there exist gaps on the side surfaces thereof except the hinge 4. To seal the gaps, on the three side surfaces are placed a sealing tape 6a and a sealing tape 6b with a location from which the lead 13 is drawn as shown in FIGS. 2A to 2D. Although the thickness of the battery block 1 varies due to thickness-dimension errors occurring in the rechargeable battery 3, dimensional deviations occurring in the members constituting the battery block 1, or assembly errors, by creating gaps between the upper and lower cases 2a and 2b confronting each other, the variation of the thickness of the battery block 1 can be properly adjusted with the width of the gap. Since the gaps are sealed with the sealing tapes 6a and 6b, the appearance of the battery pack remains the same.

As shown in FIGS. 2A to 2D, the battery pack constituted by the battery block 1 housed in the pack case 2 has a thickness as small as the sum of the thickness of the rechargeable battery 3 and the sheet thickness of the pack case 2, and has the shape of rectangular parallelepiped. Accordingly, it fits into a narrow space left in a portable computer.

Moreover, as shown in FIGS. 1, 2A to 2D, and 3, the lower case 2b has on its inner surface a convex strip 10 which is fitted between the rechargeable batteries 3 and the first and second circuit substrates 5a and 5b, and the upper case 2a has on its inner surface a position control convex portion 12 which makes contact with the outer surfaces of the first and second circuit substrates 5a and 5b.

The convex strip 10, when leakage of electrolyte from the rechargeable battery 3 occurs, prevents the electrolyte from reaching the first and second circuit substrates 5a and 5b. This protects the electronic circuit against damage resulting from the leakage of electrolyte. Although it is preferable that the convex strip 10 be given as high a height as possible, since the quantity of electrolyte exuding from the rechargeable battery 3 constitutes only 2% of the total electrolyte quantity, even though the height is relatively small, it never occurs that the seepage of electrolyte flows over the convex strip 10. Even in a case where the convex strip 10 is given only a reasonable height from the viewpoint of vacuum molding, the desired effect is attained.

Moreover, the position control convex portion 12 controls the placement positions of the first and second circuit substrates 5a and 5b by being abutted against the outer surfaces thereof. This makes it possible to prevent a positional deviation that might occur when the pack case receives a shock or other, and to improve the rigidity of the end portion of the pack case 2 that possesses the lowest strength because it is formed from a thin sheet.

The battery pack of the invention may employ a plurality of cylindrical rechargeable batteries arranged in parallel in the pack case 2.

According to the present invention, a battery pack smaller in size and lighter in weight is realized. Further, by providing a convex strip and a position control convex portion in the pack case, the rigidity improves. This makes it possible to fabricate a light-weight battery pack by using a thin-walled case, and to cope with leakage of electrolyte. Consequently, a highly reliable battery pack is realized.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack comprising:
   a battery block composed of a rechargeable battery and a circuit substrate constituting a power circuit, the battery and the substrate being formed integrally together;
   a pack case, made from a thin-walled resin sheet, for housing the battery block, the pack case being formed of an upper case and a lower case in a shape of a half-shell rectangular parallelepiped formed integrally together with their one sides coupled to each other by a hinge; and
   a strip of tape for joining together side surfaces of the upper and lower cases of the pack case.

2. A battery pack comprising:
   a battery block composed of a flat prismatic rechargeable battery and a circuit substrate disposed on a shorter-side surface of the rechargeable battery, the battery and the substrate being formed integrally together;
   a pack case, made from a thin-walled resin sheet, for housing the battery block, the pack case being formed of an upper case and a lower case in a shape of a half-shell rectangular parallelepiped formed integrally together with their one sides coupled to each other by a hinge; and
   a strip of tape for joining together side surfaces of the upper and lower cases of the pack case.

3. The battery pack according to claim 1, wherein the pack case comprises vacuum molded construction.

4. The battery pack according to claim 1, wherein the pack case comprises compressed air formed construction.

5. The battery pack according to claim 1, wherein the upper and lower cases are fabricated such that a sum of inside dimensional heights thereof is smaller than a thickness dimension of the battery block.

6. The battery pack according to claim 2, wherein the upper and lower cases are fabricated such that a sum of inside dimensional heights thereof is smaller than a thickness dimension of the battery block.

7. The battery pack according to claim 1, wherein one of the upper and lower cases has, on its inner surface, a convex strip protruding between the rechargeable battery and the circuit substrate.

8. The battery pack according to claim 2, wherein one of the upper and lower cases has, on its inner surface, a convex strip protruding between the rechargeable battery and the circuit substrate.

9. The battery pack according to claim 1, wherein one of the upper and lower cases has, on its inner surface, a convex portion for controlling a position of the circuit substrate.

10. The battery pack according to claim 2, wherein one of the upper and lower cases has, on its inner surface, a convex portion for controlling a position of the circuit substrate.

* * * * *